United States Patent
Heix et al.

(10) Patent No.: US 7,693,948 B2
(45) Date of Patent: Apr. 6, 2010

(54) EMAIL TRAFFIC INTEGRATION INTO A KNOWLEDGE MANAGEMENT SYSTEM

(75) Inventors: Andreas J. Heix, Heidelberg (DE); Roland Preussmann, Karlsruhe (DE); Hans-Juergen Richstein, Rauenberg (DE)

(73) Assignee: SAP AG, Walldorf (DE)

( * ) Notice: Subject to any disclaimer, the term of this patent is extended or adjusted under 35 U.S.C. 154(b) by 504 days.

(21) Appl. No.: 11/435,131

(22) Filed: May 15, 2006

(65) Prior Publication Data

US 2007/0266102 A1  Nov. 15, 2007

(51) Int. Cl.
*G06F 15/16* (2006.01)
(52) U.S. Cl. ..................................... 709/206
(58) Field of Classification Search ........................ None
See application file for complete search history.

(56) References Cited

U.S. PATENT DOCUMENTS

| | | | | |
|---|---|---|---|---|
| 6,092,101 | A * | 7/2000 | Birrell et al. | 709/206 |
| 6,249,807 | B1 * | 6/2001 | Shaw et al. | 709/206 |
| 6,625,619 | B1 * | 9/2003 | McClendon et al. | 707/104.1 |
| 6,728,733 | B2 * | 4/2004 | Tokui | 707/200 |
| 6,769,012 | B1 * | 7/2004 | Liu et al. | 709/204 |
| 6,915,333 | B2 * | 7/2005 | Delia et al. | 709/206 |
| 7,000,551 | B2 * | 2/2006 | Cole et al. | 110/336 |
| 7,003,551 | B2 * | 2/2006 | Malik | 709/206 |
| 7,058,641 | B1 * | 6/2006 | Franz | 707/101 |
| 7,155,481 | B2 * | 12/2006 | Prahlad et al. | 709/206 |
| 7,293,006 | B2 * | 11/2007 | Beckius et al. | 707/1 |
| 7,343,365 | B2 * | 3/2008 | Farnham et al. | 707/1 |
| 2002/0111942 | A1 * | 8/2002 | Campbell et al. | 707/3 |
| 2002/0199061 | A1 * | 12/2002 | Friedman et al. | 711/118 |
| 2004/0064473 | A1 * | 4/2004 | Thomas et al. | 707/102 |
| 2004/0083432 | A1 * | 4/2004 | Kawamura et al. | 715/526 |
| 2004/0254938 | A1 * | 12/2004 | Marcjan et al. | 707/100 |
| 2004/0255301 | A1 * | 12/2004 | Turski et al. | 719/316 |
| 2004/0267779 | A1 * | 12/2004 | Carter et al. | 707/100 |
| 2005/0052692 | A1 * | 3/2005 | Buschi et al. | 358/1.15 |
| 2005/0114450 | A1 * | 5/2005 | DeVos | 709/206 |
| 2005/0198166 | A1 * | 9/2005 | Kawaji | 709/206 |
| 2005/0256842 | A1 * | 11/2005 | Marcjan et al. | 707/1 |
| 2006/0031309 | A1 * | 2/2006 | Luoffo et al. | 709/206 |
| 2006/0080278 | A1 * | 4/2006 | Neiditsch et al. | 707/1 |
| 2006/0190830 | A1 * | 8/2006 | Gerstl et al. | 715/757 |
| 2007/0016613 | A1 * | 1/2007 | Foresti et al. | 707/104.1 |
| 2007/0100843 | A1 * | 5/2007 | Chen et al. | 707/100 |
| 2007/0133806 | A1 * | 6/2007 | Asano | 380/277 |
| 2007/0174394 | A1 * | 7/2007 | Jayaweera | 709/206 |

* cited by examiner

*Primary Examiner*—Joseph E Avellino
*Assistant Examiner*—Dung Huynh
(74) *Attorney, Agent, or Firm*—Mintz, Levin, Cohn, Ferris, Glovsky and Popeo, P.C.

(57) ABSTRACT

A plurality of e-mails are received, a portion of which contain attachments. The e-mails and the attachments are stored in one or more data repositories. The header information from the e-mails and the content from both of the e-mails and the attachments can be used to generate an index. Thereafter, the e-mails and the attachments can be logically associated to generate a plurality of hierarchical taxonomies characterizing the e-mails and the attachments.

13 Claims, 3 Drawing Sheets

EMAIL TRAFFIC INTEGRATION INTO A KNOWLEDGE MANAGEMENT SYSTEM

TECHNICAL FIELD

The subject matter described herein relates to integration of e-mail traffic into a knowledge management system.

BACKGROUND

Knowledge management ("KM") is an approach to improving organizational outcomes and organizational learning by introducing into an organization a range of specific processes and practices for identifying and capturing knowledge, know-how, expertise and other intellectual capital within the organization, and for making such intellectual assets available for transfer and reuse across the organization. KM acts to transform and institutionalize information and intellectual assets into enduring value.

An increasing amount of intellectual assets is being exchanged within an organization via e-mail. E-mail is being used not only for traditional corporate communications relating to corporate policies and procedures, but it is also used for the exchange of information, both on a company-wide level and smaller subsets, regarding fundamental business processes such as research and development, manufacturing, marketing, sales activities, and the like.

Notwithstanding the important of e-mail, only a small portion of e-mail traffic is ever captured and placed within a KM system. A typical behavior pattern is that an individual only transforms data into a document and checks such a document into a KM repository if they believe that the document will be useful for an extended period of time. In addition, individuals also tend to wait until a project or an escalation is finalized before generating documents to place within a KM repository. Unfortunately, much of the value from a KM system comes from failed or incomplete projects and, as a result, relevant information is omitted.

Moreover, even if a portion of e-mail traffic is placed within a KM system, such e-mails are often not organized in an optimal fashion. For example, an e-mail may be associated with a single folder (e.g., "Ramp-Up", etc.) despite its being applicable to multiple topics (e.g., "NetWeaver04", "Customer X", "J2EE", etc.). Furthermore, relevant information may be stored in attachments making it difficult to search.

SUMMARY

In one aspect, a plurality of e-mails are received, at least a portion of which contain one or more attachments. Thereafter, the e-mails and the attachments are stored in at least one data repository and are indexed. The indexing can be based on header information in the e-mails and/or the contents of the e-mails and the attachments. Thereafter, the e-mails and the attachments are logically associated to generate a plurality of hierarchical taxonomies that include nodes that characterize the e-mails and the attachments.

In some variations, access to the e-mails and/or attachments can be limited using an access control list. With such an arrangement, only authorized users as defined by the access control list can view or otherwise access e-mails or attachments responsive to a search query. In addition or in the alternative, only results responsive to a search query for which a user has permission to access are used to form a taxonomy for display to a user.

The nodes of the hierarchy can include links identifying a storage location within the at least one data repository, which when activated, open the corresponding e-mail or attachment.

The taxonomies can additionally be based on the manner in which certain documents are stored. For example, all e-mails and associated attachments that are directed or copy a recipient e-mail address (as defined in the e-mail header) can be stored within a single folder. The root folder in such situations could be the recipient e-mail address, or optionally, the title of the first e-mail for a given topic. In addition, further related e-mail correspondence may be stored in a hierarchical nature in the at least one data repository. In some variations, results responsive to a search query can be hierarchically displayed based on the associated taxonomies.

In an interrelated aspect, e-mails are received that contain headers identifying at least one recipient e-mail address. In addition, at least some of the e-mails contain attachments. Thereafter, the recipient e-mail addresses are associated with one or more groups. Once these group associations have been made, the e-mails and the attachments are hierarchically stored in at least one data repository according to the associated groups.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. Chief among those advantages is that a knowledge management system may be continually updated with e-mails and associated attachments with minimal or no involvement from a user. This knowledge management system can further arrange such e-mails and attachments in a hierarchical fashion so that taxonomies may be generated and displayed in response to queries of the knowledge management system. Moreover, by providing enhanced access to a knowledge management system, users can readily obtain responsive results. In addition, access to portions of the knowledge management system may be limited to users based on their respective permission levels.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
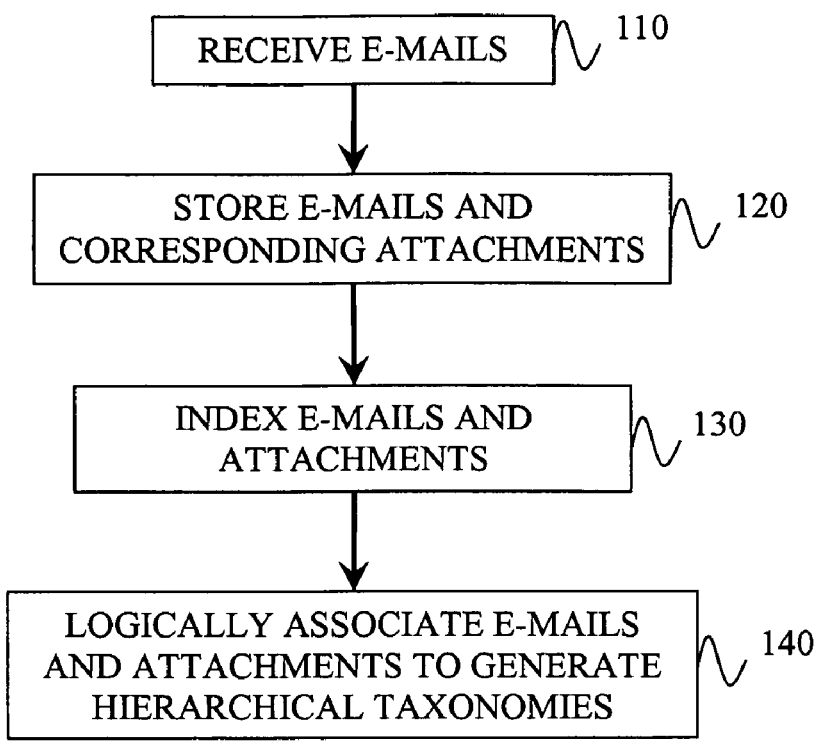
FIG. 1 is a process flow diagram illustrating storing and logically associating e-mails and attachments.

FIG. 1 is a process flow diagram illustrating a method 100 in which, at 100, a plurality of e-mails are received. At least a portion of these e-mails contain one or more attachments (e.g., a computer file attached to an e-mail message in unencoded form, or encoded in a number of ways: base64, binhex, uuencoding, quoted-printable, etc.). Thereafter, at 120, the e-mails and the attachments are stored in at least one data repository. In some variations, the e-mails are stored separately from the attachments, if any (i.e., the e-mail is stored without the attachments and the attachments are also stored). Once the e-mails and attachments are stored, at 130, the e-mails and the attachments are indexed based on factors such as header information in the e-mails, content of the e-mails, and/or content of the attachments. The indexing is used, at 140, to logically associate the e-mails and attachments in order to generate a plurality of hierarchical taxonomies. These taxonomies comprises nodes characterizing the e-mails and the attachments.

Figure 2:
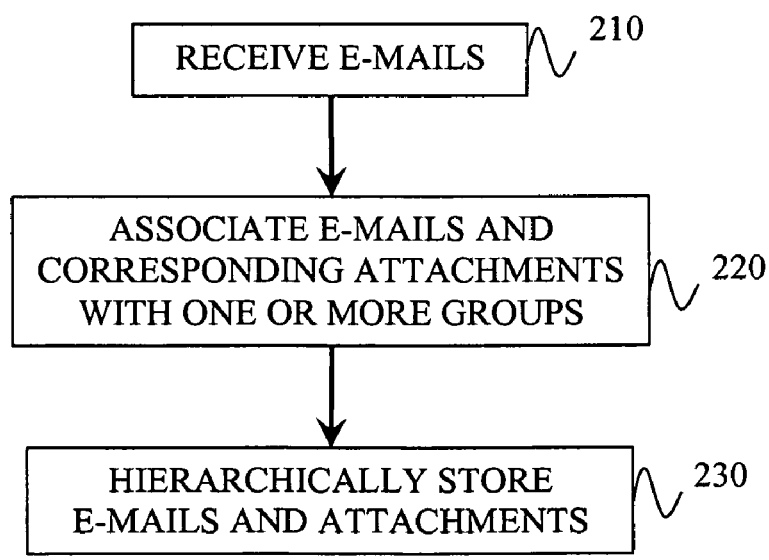
FIG. 2 is a process flow diagram illustrating grouping and hierarchically storing e-mails and attachments.

FIG. 2 is a process flow diagram illustrating a method 200 that is interrelated to the method 100 of FIG. 1. With this implementation, at 210, e-mails are received that contain headers identifying at least one recipient e-mail address. In addition, at least a portion of the e-mails contain one or more attachments. The recipient e-mail addresses for each received e-mail are associated, at 220, with one or more groups. Based on this association, the e-mails and the attachments are, at 230, hierarchically stored in at least one data repository according to the associated groups. In some variations, the e-mails are stored without attachments and each attachment is stored in the data repository.

The following provides optional variations which can be used singly or in combination depending on the desired implementation.

Figure 3:
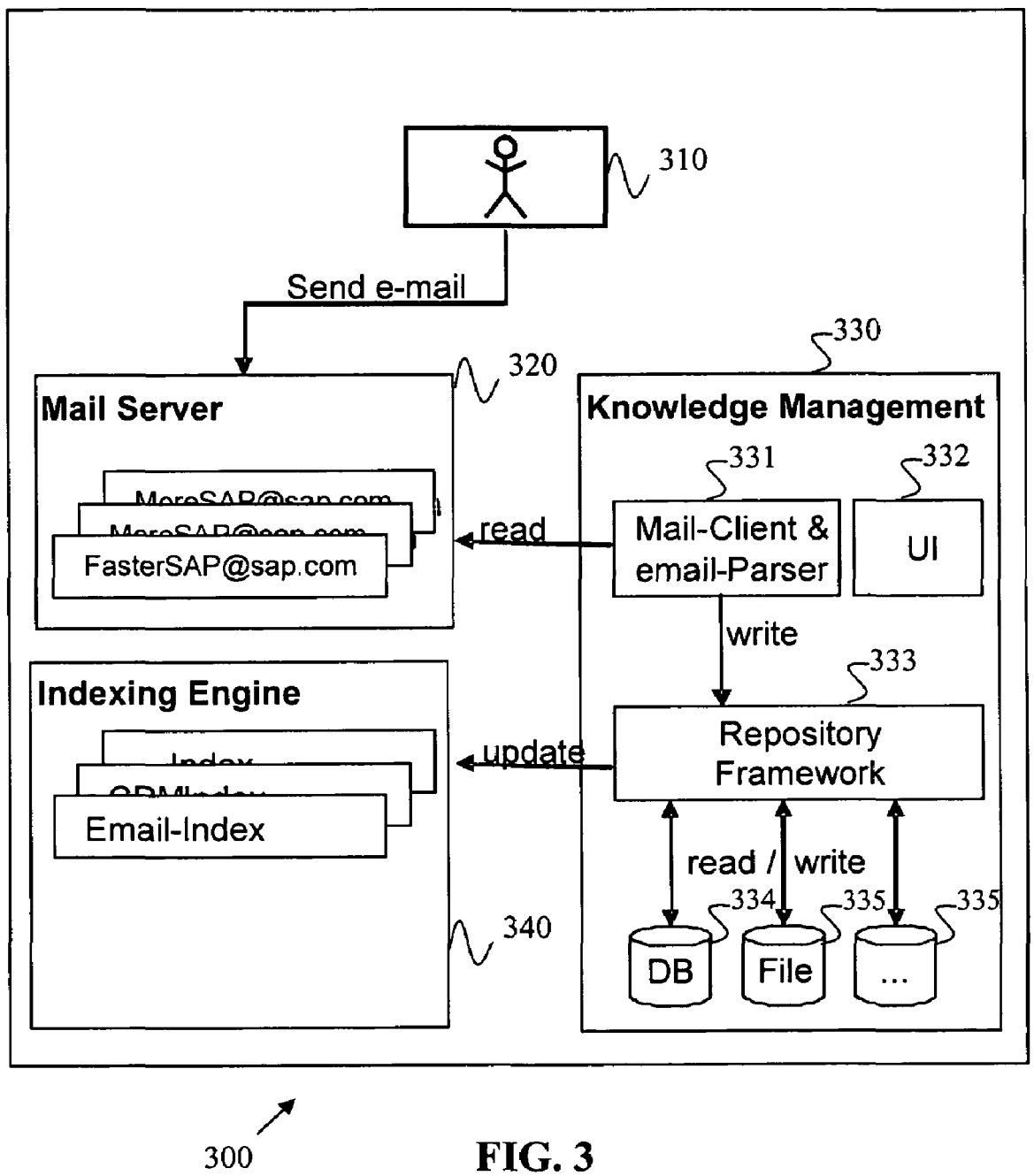
FIG. 3 is a first schematic diagram illustrating a knowledge management system coupled to a mail server and an indexing engine.
Figure 4:
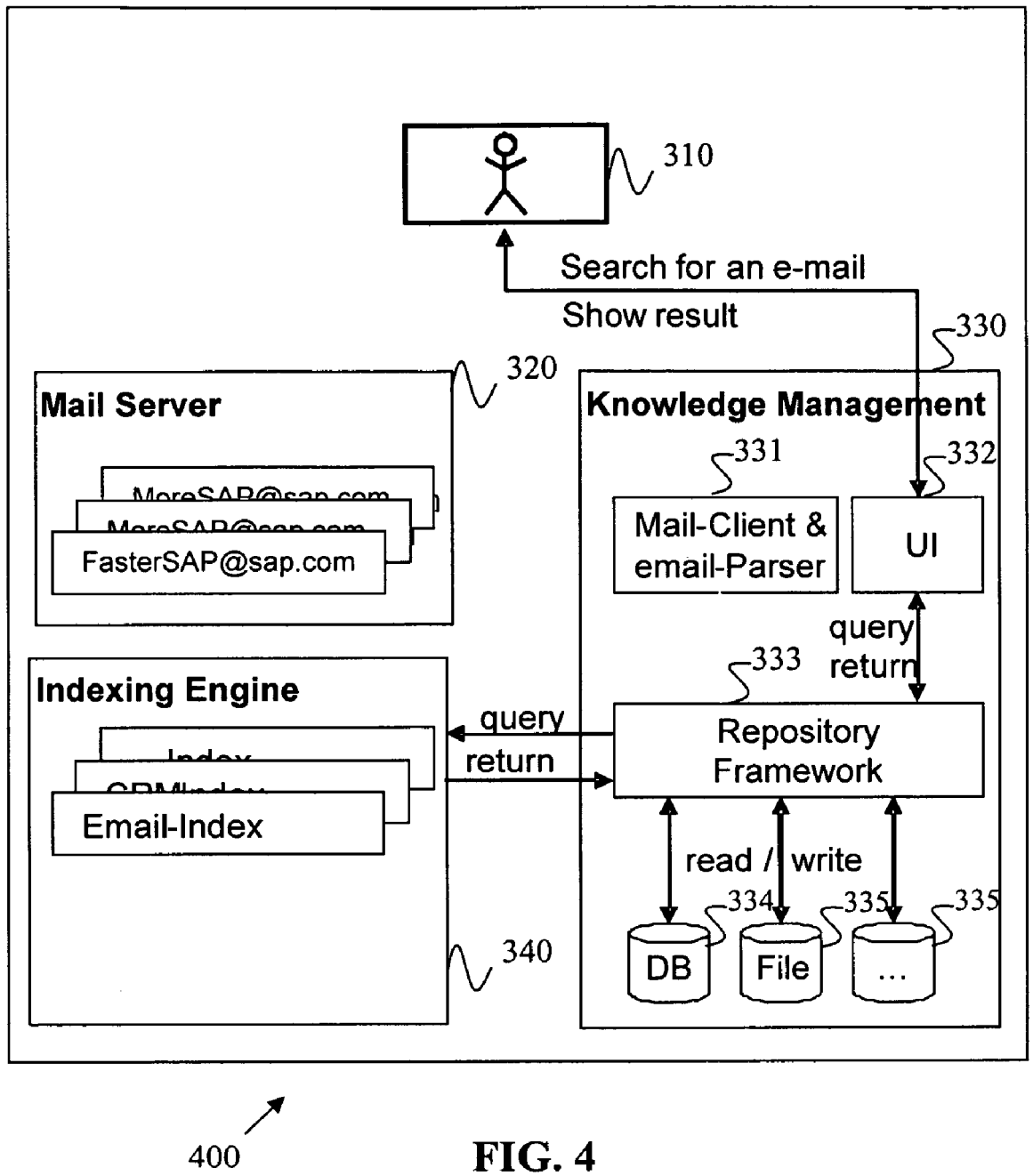
FIG. 4 is a second schematic diagram illustrating a knowledge management system coupled to a mail server and an indexing engine.

FIG. 3 is a schematic diagram 300 illustrating a client 310, a mail server 320, a knowledge management system 330, and an indexing engine 340 (e.g., a TREX engine provided by SAP AG) in connection with sending an e-mail initiated by the client 310. FIG. 4 is a schematic diagram 400 illustrating the client, the mail server 320, the knowledge management system 330, and the indexing engine 340 in connection with a search query initiated by the client 310.

With reference to FIG. 3, the client 310 initiates the sending of an e-mail to an e-mail address "FasterSAP@sap.com" which signifies, for example, the e-mail address associated with a group. The mail server 320 which is associated with the group e-mail address receives this e-mail. On a periodic basis, a mail client and e-mail parser 331 in the knowledge management system 330 polls the mail server 320 to pull any new e-mails addressed to the group e-mail address. A repository framework 331 coupled to the mail client and e-mail parser 331 causes the e-mail and any attachments to stored in one or more of a database 334 or other file structure 335. In some variations, each attachment is analyzed in order to determine whether the attachment has previously been stored (to avoid duplicate storage). Such an analysis can, for example, utilize an SHA-algorithm by having a short checksum that is calculated by from the content of the attachment. Additionally, the mail client and e-mail parser 331 updates the indexing engine 340 so that both the e-mail and any attachments can be indexed and logically associated.

With reference to FIG. 4, the client 310 generates a search query (e.g., key word query) for an e-mail or attachment via a user interface 332 of the knowledge management system 332. The user interface passes the search query onto the repository framework 33 which in turn queries the indexing engine 340 for e-mails or attachments responsive to the query. The repository framework 333 then identifies the locations of the e-mails or attachments and generates results characterizing the responsive e-mails and attachments. These results are subsequently provided to the client 310 via the user interface 332.

The header information in each e-mail (e.g., FROM, TO, CC, BCC, Date, Attachment) can be extracted for each e-mail and used for indexing purposes by the indexing engine 340 for both the e-mail and any corresponding attachments. Not only can the header information be utilized for indexing, but the content of the respective e-mails and attachments can be used for indexing.

The results of any search query can be displayed in the form of a hierarchically arranged taxonomy with each node of the hierarchy comprising a link, which when activated, causes the corresponding e-mail and/or attachment to be displayed or opened. Examples of taxonomies responsive to search queries can be found in co-pending U.S. patent application Ser. No. 11/321,926, the contents of which are hereby fully incorporated by reference. For a thread of e-mails, the root node of the taxonomy can comprise the original e-mail which began the thread and the child nodes can characterize responses to such original e-mail. If there are three direct responses to the original e-mail, then these responses would form first generation child nodes depending from the root node. Any later responses to these direct responses would in turn form second generation child nodes depending from the first generation child node and so on. Similar nodal relationships can be defined for attachments which are subject to multiple revisions.

In addition, the results of any search query can be restricted to users having authorization. In this regard, in some variations, access control lists can be used to define groups of users that are able to view certain e-mails or attachments. For example, if an e-mail is sent to a group called "OurProject-Team", a copy of this e-mail is stored in the knowledge management system 330 and only users in the "OurProject-Team" group are able to subsequently read this e-mail. With this arrangement, users can be subsequently added or deleted from the access control lists to ensure that security to any relevant e-mails or attachments is continually updated. Moreover, based on the authorizations provided by a mechanism such as an access control list, certain nodes for which a user does not have permission to access may be omitted from the taxonomies responsive to search queries (as opposed to displaying the nodes and limiting access thereto).

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. An article comprising a non-transitory machine-readable storage, medium tangibly embodying instructions that when performed by one or more machines result in operations comprising:
    receiving a plurality of e-mails, at least a portion of the e-mails containing attachments;
    separately storing the plurality of e-mails and the plurality of attachments in at least one data repository;
    indexing the plurality of e-mails and the plurality of attachments based on at least one of header information in the e-mails or content of the plurality of e-mails and the plurality of attachments;
    logically associating the e-mails and the attachments to generate a plurality of hierarchical taxonomies comprising nodes characterizing the plurality of e-mails and the plurality of attachments, the hierarchical taxonomies including, for a thread of e-mails, a root node comprising an initial e-mail for the thread, first generation child nodes depending from the root node comprising responses to the initial e-mail, and second generation child nodes depending from at least one first generation child node comprising responses to an e-mail associated with a corresponding first generation child node such that the thread of e-mails includes at least two second generation child nodes that depend on different first generation child nodes; and
    rendering a taxonomy for a user, the rendered taxonomy solely including e-mails and attachments that the user is authorized to access such that the taxonomy includes at least one second generation node that the user is authorized to access while omitting a first generation node upon which such second generation node depends that the user is not authorized to access;
    wherein:
    at least a portion of the stored e-mails and the attachment are associated with at least one access control list; and
    access to stored e-mails and attachments is limited to authorized users defined by the corresponding access control list.

2. An article as in claim 1, wherein each node comprises a link to the corresponding stored e-mail or attachments in the at least one data repository.

3. An article as in claim 1, wherein the e-mails and the attachments are stored based on a recipient e-mail address in the header information.

4. An article as in claim 3, wherein all e-mails and corresponding attachments for each recipient e-mail address are stored in a root folder associated with the recipient e-mail address.

5. An article as in claim 1, further comprising instructions that when performed by one or more machines result in operations comprising: receiving a search query; and displaying e-mails and attachments responsive to the search query.

6. An article as in claim 1, wherein separately storing the plurality of e-mails and the plurality of attachments in at least one data repository comprises:
    determining whether an e-mail or an attachment has been previously stored; and
    storing the e-mail or attachment if such e-mail or attachment has not been previously stored.

7. A computer-implemented method comprising:
    receiving a plurality of e-mails, at least a portion of the e-mails containing attachments;
    separately storing the plurality of e-mails and the plurality of attachments in at least one data repository;
    indexing the plurality of e-mails and the plurality of attachments based on at least one of header information in the e-mails or content of the plurality of e-mails and the plurality of attachments;
    logically associating the e-mails and the attachments to generate a plurality of hierarchical taxonomies comprising nodes characterizing the plurality of e-mails and the plurality of attachments, the hierarchical taxonomies including, for a thread of e-mails, a root node comprising an initial e-mail for the thread, first generation child nodes depending from the root node comprising responses to the initial e-mail, and second generation child nodes depending from at least one first generation child node comprising responses to an e-mail associated with a corresponding first generation child node; and
    rendering a taxonomy for a user, the rendered taxonomy solely including e-mails and attachments that the user is authorized to access such that the taxonomy includes at least one second generation node that the user is authorized to access while omitting a first generation node upon which such second generation node depends that the user is not authorized to access;
    wherein:
    at least a portion of the stored e-mails and the attachment are associated with at least one access control list; and
    access to stored e-mails and attachments is limited to authorized users defined by the corresponding access control list.

8. A method as in claim 7, wherein each node comprises a link to the corresponding stored e-mail or attachments in the at least one data repository.

9. A method as in claim 7, wherein the e-mails and the attachments are stored based on a recipient e-mail address in the header information.

10. A method as in claim 9, wherein all e-mails and corresponding attachments for each recipient e-mail address are stored in a root folder associated with the recipient e-mail address.

11. A method as in claim 7, further comprising:
receiving a search query; and
displaying e-mails and attachments responsive to the search query.

12. A method as in claim 7, wherein separately storing the plurality of e-mails and the plurality of attachments in at least one data repository comprises:
determining whether an e-mail or an attachment has been previously stored; and
storing the e-mail or attachment if such e-mail or attachment has not been previously stored.

13. A computer system comprising one or more data processors and memory coupled to the one or more data processors, the memory storing instructions to cause the one or more data processors to perform operation comprising:
receiving, by at least one data processor, a plurality of e-mails, at least a portion of the e-mails containing attachments;
separately storing, by at least one data processor, the plurality of e-mails and the plurality of attachments in at least one data repository;
indexing, by at least one data processor, the plurality of e-mails and the plurality of attachments based on at least one of header information in the e-mails or content of the plurality of e-mails and the plurality of attachments;
logically associating, by at least one data processor, the e-mails and the attachments to generate a plurality of hierarchical taxonomies comprising nodes characterizing the plurality of e-mails and the plurality of attachments, the hierarchical taxonomies including, for a thread of e-mails, a root node comprising an initial e-mail for the thread, first generation child nodes depending from the root node comprising responses to the initial e-mail, and second generation child nodes depending from at least one first generation child node comprising responses to an e-mail associated with a corresponding first generation child node such that the thread of e-mails includes at least two second generation child nodes that depend on different first generation child nodes; and
rendering, by at least one data processor, a taxonomy for a user, the rendered taxonomy solely including e-mails and attachments that the user is authorized to access such that the taxonomy includes at least one second generation node that the user is authorized to access while omitting a first generation node upon which such second generation node depends that the user is not authorized to access;

wherein:

at least a portion of the stored e-mails and the attachment are associated with at least one access control list; and access to stored e-mails and attachments is limited to authorized users defined by the corresponding access control list.

* * * * *